C. H. BURGARD.
CONVEYER AND MIXER.
APPLICATION FILED AUG. 23, 1915.
1,211,398.
Patented Jan. 9, 1917.
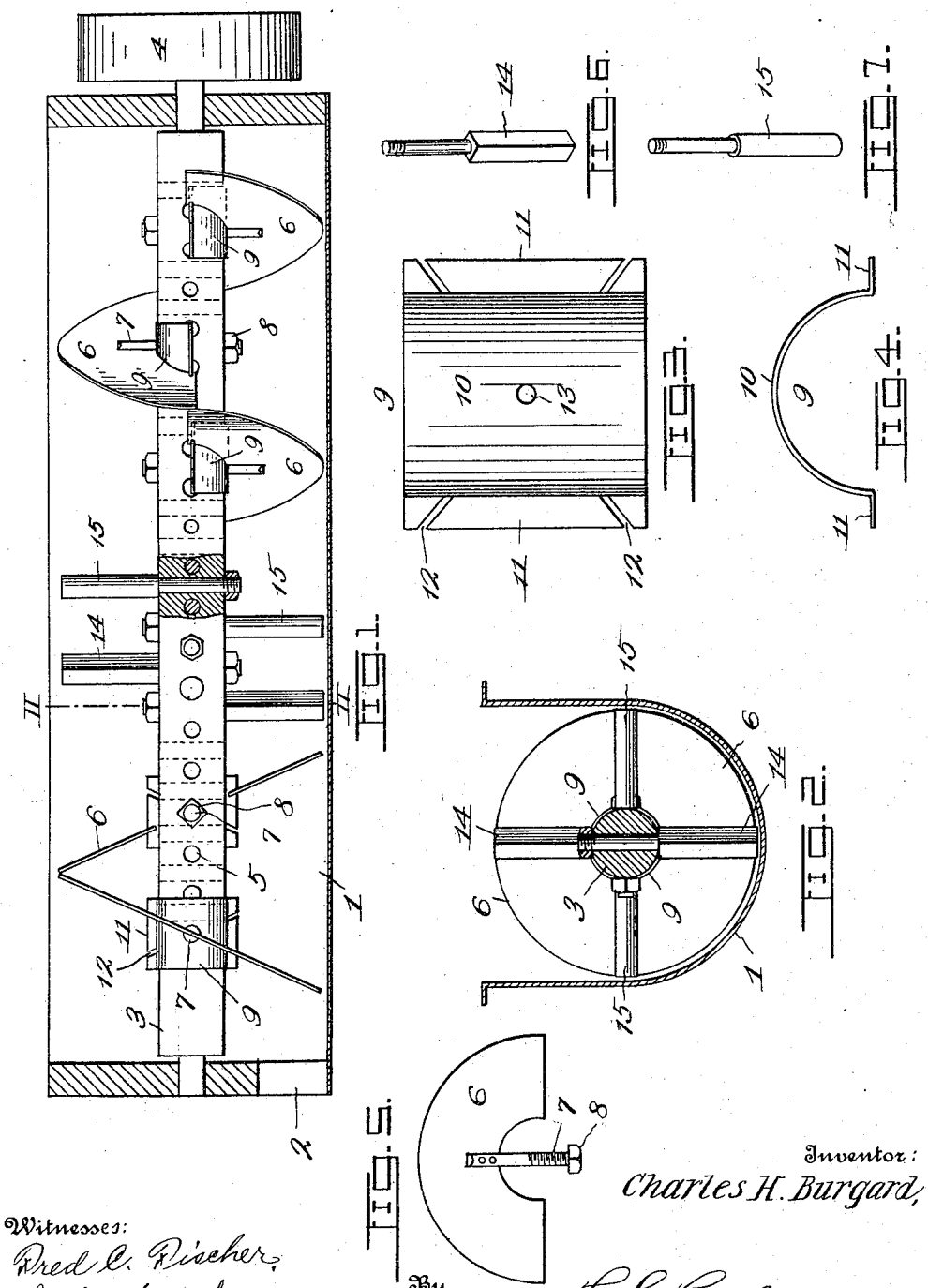
Witnesses:
Fred C. Fischer
L. J. Fischer
Inventor:
Charles H. Burgard,
By
F. G. Fischer,
Attorney.

UNITED STATES PATENT OFFICE.

CHARLES H. BURGARD, OF LEAVENWORTH, KANSAS.

CONVEYER AND MIXER.

1,211,398.  Specification of Letters Patent.  Patented Jan. 9, 1917.

Application filed August 23, 1915. Serial No. 46,850.

*To all whom it may concern:*

Be it known that I, CHARLES H. BURGARD, a citizen of the United States, residing at Leavenworth, in the county of Leavenworth and State of Kansas, have invented certain new and useful Improvements in Conveyers and Mixers, of which the following is a specification.

My invention relates to conveyers and mixers for conveying, mixing, and tempering wheat, meal, cement, etc., and it may also be used to advantage in heating, steaming, and cooling wheat and other products; also for washing, scouring, and polishing the same.

Important features of the invention reside in the provision of segmental flights and holders for securing said flights in reversible positions, and in order that said invention may be fully understood, reference will now be made to the accompanying drawing, in which:

Figure 1 is a side elevation, partly in section, of the conveyer. Fig. 2 is a cross section on line II—II of Fig. 1. Fig. 3 is a plan view of a segmental flight holder constituting an important feature of the invention. Fig. 4 is an end view of the segmental flight holder. Fig. 5 is a detail elevation of one of the flights. Fig. 6 is a detail perspective of a rectangular peg flight. Fig. 7 is a detail perspective of a cylindrical peg flight.

Referring now in detail to the drawing, 1 designates a chamber having a discharge opening 2 at one end thereof.

3 designates a shaft journaled in the ends of the chamber 1 and provided with a suitable drive pulley 4. The shaft 3 has a series of holes 5 extending therethrough, one-half the number of said holes being arranged transversely and alternately with respect to the remainder of the holes, as disclosed by full and dotted lines, Fig. 1.

6 designates the flights, each of which is segmental in form and has a central pin 7, threaded at its free end to receive a nut 8, whereby it is secured to the shaft 3. The pins 7 are of such size as to pass through any of the holes 5 and project therefrom to receive the nuts 8.

9 designates segmental flight holders to prevent the pins 7 from turning in the holes 5 and for firmly holding the flights 6 at a proper pitch to each other. Each flight holder 9 has a segmental portion 10, to snugly fit the shaft 3, and oppositely extending flanges 11 provided near their ends with diagonal slots 12, to receive the ends of flights 6, which are firmly held from lateral movement by the sides of said slots. The segmental portion 10, has a centrally-disposed hole 13, for the passage of the flight pin 7.

By arranging the flights 6 as disclosed by Fig. 1, they drive the material in the chamber 1 toward the discharge opening 2, but should the discharge opening be located in the opposite end of the chamber, said flights are reversed to enter the opposite slots 12 from those in which they are shown in Fig. 1. When desired the flights 6 can also be arranged reversely to each other to mix different materials as well as force the same toward the discharge end of the chamber 1.

14 designates rectangular flight pegs, and 15 cylindrical flight pegs secured to the shaft 3 to coöperate with the flights 6. It is optional with the user whether the shaft 3 be equipped with an assortment of flights 6, 14 and 15, as shown by Fig. 1, or whether either form is used separately, as good results are obtained in each instance.

From the foregoing description, it is apparent that I have produced a conveyer and mixer of simple and inexpensive construction, and well adapted for the purposes intended, and I reserve the right to make such changes in the construction, arrangement, and proportion of parts as properly fall within the spirit and scope of the claims.

Having thus described my invention, what I claim and desire to secure by Letters Patent, is:

1. In a conveyer of the character described, a shaft, a flight holder adapted to fit said shaft and provided with slotted margins, and a segmental flight adapted to be secured to the shaft and held at a certain pitch by the slotted margins of the flight holder.

2. In a conveyer of the character described, a shaft, a flight holder consisting of a segmental portion provided with oppositely-extending flanges having diagonal slots therein, and a flight adapted to enter the diagonal slots in the flight holder and provided with a pin whereby it is secured to the shaft.

3. In a conveyer of the character described, a shaft, a flight holder adapted to fit said shaft and provided with oppositely-disposed flanges having slots arranged at an angle therein, a segmental flight having ends arranged to enter said slots, and a threaded pin to extend through the flight holder and the shaft and secure the flight thereon.

4. In a conveyer of the character described, a shaft, a flight holder adapted to fit said shaft and provided with oppositely-disposed marginal flanges, and a flight adapted to be secured to the shaft and engage the flanges and be held thereby at a certain pitch.

In testimony whereof I affix my signature, in the presence of two witnesses.

CHARLES H. BURGARD.

Witnesses:
  ALICE BRIND,
  G. F. DOHRN.

Copies of this patent may be obtained for five cents each, by addressing the "Commissioner of Patents. Washington, D C."